US010061045B2

(12) United States Patent
Bagaini

(10) Patent No.: US 10,061,045 B2
(45) Date of Patent: Aug. 28, 2018

(54) VIBROSEIS ACQUISITION METHOD

(71) Applicant: WesternGeco L.L.C., Houston, TX (US)

(72) Inventor: Claudio Bagaini, Cottenham (GB)

(73) Assignee: WesternGeco L.L.C., Houston, TX (US)

(*) Notice: Subject to any disclaimer, the term of this patent is extended or adjusted under 35 U.S.C. 154(b) by 893 days.

(21) Appl. No.: 14/328,166

(22) Filed: Jul. 10, 2014

(65) Prior Publication Data

US 2014/0321241 A1    Oct. 30, 2014

Related U.S. Application Data

(62) Division of application No. 12/527,505, filed as application No. PCT/GB2008/000661 on Feb. 28, 2008, now Pat. No. 8,811,116.

(30) Foreign Application Priority Data

Mar. 9, 2007    (GB) .................................. 0704542.0

(51) Int. Cl.
    *G01V 1/00*    (2006.01)
(52) U.S. Cl.
    CPC .................... *G01V 1/005* (2013.01)
(58) Field of Classification Search
    USPC ......................................................... 367/38
    See application file for complete search history.

(56) References Cited

U.S. PATENT DOCUMENTS

| | | | | |
|---|---|---|---|---|
| 4,159,463 A * | 6/1979 | Silverman | ................ | G01V 1/04 367/59 |
| 4,616,352 A * | 10/1986 | Sallas | ...................... | G01V 1/04 324/76.79 |
| 4,670,863 A * | 6/1987 | Sallas | ...................... | G01V 1/04 181/121 |
| 4,855,967 A * | 8/1989 | Sallas | ...................... | G01V 1/04 181/114 |
| 6,161,076 A * | 12/2000 | Barr | ........................ | G01V 1/36 367/117 |
| 6,418,079 B1 * | 7/2002 | Fleure | .................... | G01V 1/005 367/40 |
| 6,519,533 B1 * | 2/2003 | Jeffryes | .................... | G01V 1/36 702/17 |
| 6,603,707 B1 * | 8/2003 | Meunier | ................ | G01V 1/005 367/189 |

(Continued)

*Primary Examiner* — James R Hulka
(74) *Attorney, Agent, or Firm* — Kevin Brayton McGoff

(57) ABSTRACT

Methods and apparatuses for obtaining and/or processing slip sweep seismic survey data. The methods compute harmonic weight ratios using two types of data: 1) direct survey data where a harmonic sweep does not overlap with the fundamental component of responses of Earth interior and 2) another set of data representative of fundamental component of responses of Earth interior where the harmonic sweep does overlap with the fundamental component of responses of Earth interior. The set of data representative fundamental component of responses of Earth interior can be extracted from ground force measurements or a different sweep. The harmonic weight ratios using ground force measurements at overlapped frequencies may be calibrated with one or more harmonic weight ratios at non-overlapped frequencies.

20 Claims, 7 Drawing Sheets

(56) References Cited

U.S. PATENT DOCUMENTS

| | | | | |
|---|---|---|---|---|
| 6,665,619 B2* | 12/2003 | Bird | G01V 1/28 702/17 |
| 7,050,356 B2* | 5/2006 | Jeffryes | G01V 1/005 367/39 |
| 7,330,401 B2* | 2/2008 | Jeffryes | G01V 1/005 367/189 |
| 7,376,046 B2* | 5/2008 | Jeffryes | G01V 1/005 367/39 |
| 7,436,734 B2* | 10/2008 | Krohn | G01V 1/005 367/189 |
| 7,515,505 B2* | 4/2009 | Krohn | G01V 1/005 367/189 |
| 7,602,670 B2* | 10/2009 | Jeffryes | G01V 1/005 367/40 |
| 7,672,194 B2* | 3/2010 | Jeffryes | G01V 1/005 367/39 |
| 7,859,945 B2* | 12/2010 | Sallas | G01V 1/005 367/189 |
| 8,811,116 B2* | 8/2014 | Bagaini | G01V 1/37 367/38 |
| 2002/0152032 A1* | 10/2002 | Bird | G01V 1/28 702/17 |
| 2003/0210609 A1* | 11/2003 | Jeffryes | G01V 1/005 367/14 |
| 2006/0158962 A1* | 7/2006 | Jeffryes | G01V 1/005 367/41 |
| 2006/0250891 A1* | 11/2006 | Krohn | G01V 1/005 367/38 |
| 2007/0091721 A1* | 4/2007 | Jeffryes | G01V 1/005 367/41 |
| 2007/0133354 A1* | 6/2007 | Bagaini | G01V 1/005 367/189 |
| 2007/0195644 A1* | 8/2007 | Marples | G01V 1/005 367/39 |
| 2008/0232194 A1* | 9/2008 | Jeffryes | G01V 1/005 367/38 |
| 2009/0135671 A1* | 5/2009 | Meunier | G01V 1/005 367/56 |
| 2009/0238038 A1* | 9/2009 | Bagaini | G01V 1/04 367/37 |
| 2010/0008187 A1* | 1/2010 | Jeffryes | G01V 1/005 367/38 |
| 2010/0142320 A1 | 6/2010 | Bagaini | |
| 2010/0157733 A1* | 6/2010 | Daly | G01V 1/37 367/41 |
| 2012/0307597 A1* | 12/2012 | Sallas | G01V 1/005 367/189 |
| 2014/0321241 A1* | 10/2014 | Bagaini | G01V 1/005 367/49 |

* cited by examiner

VIBROSEIS ACQUISITION METHOD

CROSS-REFERENCE TO RELATED APPLICATIONS

The current application is a divisional application of a co-pending U.S. patent application Ser. No. 12/527,505, filed on Aug. 17, 2009, which is incorporated herein by reference in its entirety and which is the U.S. national phase of PCT application serial number PCT/GB2008/000661, filed on Feb. 28, 2008, which claims priority to United Kingdom patent application serial number GB 0704542.0, filed on Mar. 9, 2007.

BACKGROUND

The present invention relates to a method of improving Vibroseis acquisition based on the slip-sweep method.

Vibroseis acquisition is based on activation of one or more Vibroseis sources. The Vibroseis sources are vibrators designed to emit a signal of varying frequency into the ground. The signal is usually referred to as "sweep" with signal starting at the low frequency are up-sweeps and those starting at the high frequency are down-sweeps.

In a seismic acquisition, single or groups of vibrators are activated in sequence. The time lag between the start of the sweep of the previous group and the start of the sweep of the subsequent group is a critical parameter. The closer the starts the more efficient use can be made of the vibrator equipment in the field. However there are limits as to how close these two start times can be, before signal caused by the second groups leaks into the recordings relating to the sweep of the first group.

In a relatively recent variant of Vibroseis acquisition, different vibrators or groups of vibrators are operated such that their respective sweeps overlap in time, i.e., one vibrator group starts sweeping without waiting for the previous group's sweep to terminate. The main benefits of these "slip-sweeps" are that significant gains in production can be achieved with the potential to double or even triple the acquisition rate. Surveys can be recorded with a higher shotpoint density, resulting in higher fold and/or denser spatial sampling for shots.

The main trade-off of slip-sweep acquisition is the reduction of the contamination caused by harmonic distortion. Recording one long continuous record containing several sweeps has an obvious implication. Traditionally, the correlation process would shift harmonics of up-sweeps to negative lag times in the record. The harmonics are then eliminated by truncating the sweep record at the start time t=0 of the sweep in question. For slip-sweep recording, however, harmonics can no longer be eliminated by truncation but contaminate preceding sweep records.

The analysis, estimation and attenuation or removal of harmonics from signals acquired through slip-sweep acquisition has been subject to numerous studies and patent applications amongst which there are:

Seriff, A. J. and Kim, W. H., 1970, The effects of harmonic distortion in the use of vibratory surface sources, in: Geophysics, 35, 234-246 (1970);

Rozemond, H. J., Slip-sweep acquisition, in: 66th Annual International Meeting, SEG, Expanded Abstracts, 64-67 (1996);

Ras, P. et al., Harmonic distortion in slip sweep records, SEG Expanded Abstracts 18, 609-613 (1999); and the patents and patent applications U.S. Pat. No. 4,159,463; U.S. Pat. No. 6,418,079; U.S. Pat. No. 6,603,707; U.S. Pat. No. 6,665,619; U.S. Pat. No. 7,050,356 and WO 2004/031806.

With the known methods in view, the present invention proposes methods to improve the existing harmonics estimation and attenuation processes, in particular with view of further reducing the time lag between subsequent sweeps in slip-sweep acquisitions.

SUMMARY

The invention describes novel variants for performing a geophysical survey using the step of obtaining signals generated by activating vibratory sources at times $T_0$ and $T_1$, respectively, for a sweep period S and a listening time L such that $T_1 < T_0 + S + L$, wherein harmonic noise within the signals are attenuated using a first method to estimate the harmonics in a time-frequency interval in which harmonics of the sweep $T_1$ overlap with the fundamental of sweep $T_0$ and using a second method for estimating the harmonics in a time-frequency interval with no overlap.

Surveys which are conducted using the condition $T_1 < T_0 + S + L$ are slip-sweep surveys.

In a preferred embodiment of the invention, the estimates derived using the two different methods are calibrated or matched to gain preferably one single estimate for the full sweep frequency range. The harmonic estimate can then be subtracted from the obtained signals to enhance the fundamentals in the signals set.

The calibration preferably includes calibrating or matching the harmonics estimated using the second method by calibrating weights derived using the first method within the overlap interval with one or more weights derived using the second method.

The overlap frequency can be for example determined by first establishing a minimum starting time $T_1$ obtained from evaluating for $T_0 < t < T_0 + S$ a condition equal or equivalent to $$f_i(t-T_0) + \int_{T_0}^{t} SR(\tau - T_0)d\tau > n\left(f_i(t-T_1) + \int_{T_1}^{t} SR(\tau - T_1)d\tau\right),$$

where $f_i(t)$ is a function defining the instantaneous frequency for the times t during the sweep period S, SR is the instantaneous time derivative $f_i(t)/dt$, $0 < t < S$, $T_0$ is the starting time of a previous sweep n is the order of the harmonic of the subsequent sweep to be evaluated. Knowledge of the frequency-time function $f_i(t)$ of the sweep enables the determination of an overlap frequency by evaluating $f_i(T_1)$ at the minimal starting time $T_1$.

A further aspect of the invention is a method of attenuating the harmonic contamination of slip-sweep Vibroseis signals, using ground force signals or contamination-free signals and the Vibroseis signals to determine frequency dependent weights for at least a part of the frequency range of the Vibroseis sweep and using the frequency dependent weights to estimate the harmonics.

The part of the frequency range is preferably an overlap range in which the harmonics of a subsequent sweep overlap with a fundamental of an earlier sweep.

In a preferred embodiment an initial estimate of frequency dependent weights inside the overlap range is derived from the ground force signals or contamination-free signals and calibrated with frequency dependent weights at frequencies outside the overlap range.

The scope of the present invention encompasses the data derived after attenuating the harmonics and any representations of the earth derived from such clean data.

These and further aspects of the invention are described in detail in the following examples and accompanying drawings.

BRIEF DESCRIPTION OF DRAWINGS

The invention will now be described, by way of example only, with reference to the accompanying drawings, of which.

DETAILED DESCRIPTION

Figure 1:
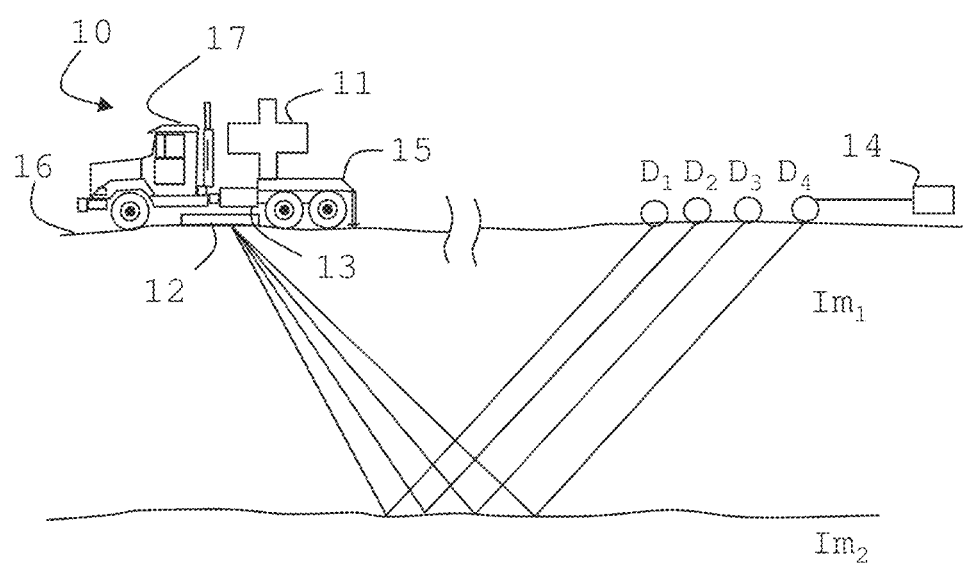
FIG. 1 illustrates an example of a Vibroseis survey.

The system of FIG. 1 illustrates in a simplified manner the elements of a Vibroseis acquisition system, such as may be used in embodiments of the present invention. In the illustrated system, a seismic vibrator 10 comprises a vibrating element or reaction mass 11, a baseplate 12 and a signal measuring apparatus 13, for example a plurality of accelerometers whose signals are combined to measure the actual ground-force signal applied to the earth by the seismic vibrator. The seismic vibrator 10 illustrated in FIG. 1 is constructed on a truck 17 that provides for maneuverability of the system. As illustrated, the reaction mass 11 is coupled with the baseplate 12 to provide for the transmission of vibrations from the vibrating element 11 to the baseplate 12. The baseplate 12 is positioned in contact with an earth surface 16 such that the vibrations of the vibrator 11 are communicated into the earth surface 16.

The seismic signal that is generated by the reaction mass 11 and emitted into the earth, via the baseplate 12, may be reflected off the interface between subsurface impedances Im1 and Im2. This reflected signal is detected by an array of receiver such as geophones D1, D2, D3, and D4, respectively. The signals generated by the vibrating element 11 on the truck 10 are also transmitted via data storage 15 to data storage 14 for combination with raw seismic data received from geophones D1, D2, D3, and D4 to provide for processing of the raw seismic data. In operation a control signal, referred to also as pilot sweep, causes the vibrating element 11 to exert a variable pressure on the baseplate 12.

In the processing of the Vibroseis data, the recording signals are correlated with a signal representing the source or original input into the earth. Typically this correlation is done between the recorded signals and the pilot sweep.

The co-owned U.S. Pat. No. 7,050,356 discloses a method to acquire slip-sweep data comprising the steps of actuating the or each vibrator in a first group vibrator at time $T_0$, and subsequently actuating the or each vibrator in a second vibrator group at time $T_1$ that satisfies the condition:

$$T_1 - T_0 \geq \frac{(n-1)S f_{max}}{n(f_{max} - f_{min})},$$ [1A]

where n is the order of the highest vibrator harmonic that cannot be ignored, S is the sweep length, $f_{min}$ and $f_{max}$ are the sweep minimum and maximum frequency. Equation 1A expresses mathematically the condition of non-overlapping in time-frequency domain of the harmonic response of order n of a sweep with the fundamental response of the previous sweep(s) first arrivals. Though typically taken as the starting times of the respective sweeps, $T_1$ and $T_o$ can also be the energy onset in the recordings or even the onset the of first energetic arrivals. Equation 1A applies to linear sweeps.

For the general case of an arbitrary pilot signal defined through its instantaneous frequency $f_i(t)$ for the times t during the sweep period S, i.e., 0<t<S and its instantaneous frequency time derivative (the sweep rate) with: SR=d $f_i(t)$/dt, 0<t<S, the minimum slip-time for up-sweep surveys to avoid overlap in time-frequency between the response of the fundamental of a previous sweep and the $n^{th}$ harmonic of the subsequent sweep can be derived by determining the minimum of $T_1$, $T_{1min}$, that satisfies for $T_0$<t<$T_0$+S the relation:

$$f_i(0) + \int_{T_0}^{t} SR(\tau - T_0) d\tau > n\left(f_i(0) + \int_{T_1}^{t} SR(\tau - T_1) d\tau\right)$$ [1B]

Equation 1B can be analytically or numerically solved if $f_i(t)$ is known. Values of $T_1$ smaller than $T_{1min}$ cause the overlap in time-frequency domain.

For a given starting time $T_1$, the above equations can be used to determine an overlap time $T_{OL}$ or several overlap times. At the overlap time, the harmonic response of a sweep overlaps with the Vibroseis fundamental signal of at least one previous sweep, e.g. the sweep with the starting time $T_0$. The equations 1A and 1B hold for earlier sweeps by simply using the appropriate respective starting time of the sweep in question.

Knowledge of the overlap time $T_{OL}$ and the instantaneous frequency of the fundamental sweep give the overlap frequency $f_{OL}$ or current harmonics as labeled by n. To illustrate the distortion of the signal, FIG. 2 illustrates several cases of harmonic signals of a subsequent sweep deteriorating the signals of a previous sweep.

In FIG. 2 there are shown plots of Vibroseis sweeps in the time-frequency domain. The sweeps are for simplicity assumed to be linear, however the present invention encompasses both linear and non-linear sweeps. Each sweep is followed by a listening time indicated in FIG. 2 as hashed areas. Sweeps, their harmonics and the listening time are shown prior to correlation with the pilot sweep.

Figure 2A:
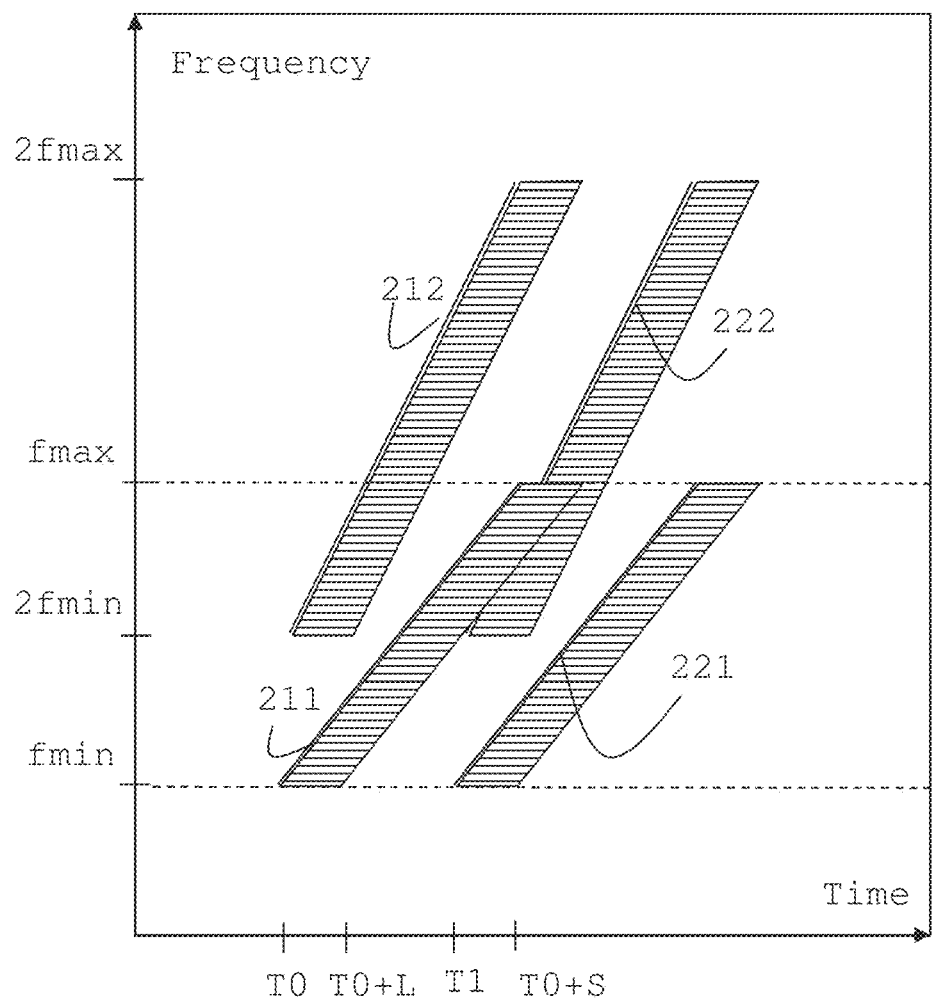
FIGS. 2A-2C illustrate how harmonics of a subsequent sweep deteriorate the signal of a previous sweep or previous sweeps (FIG. 2C)
Figure 2B:
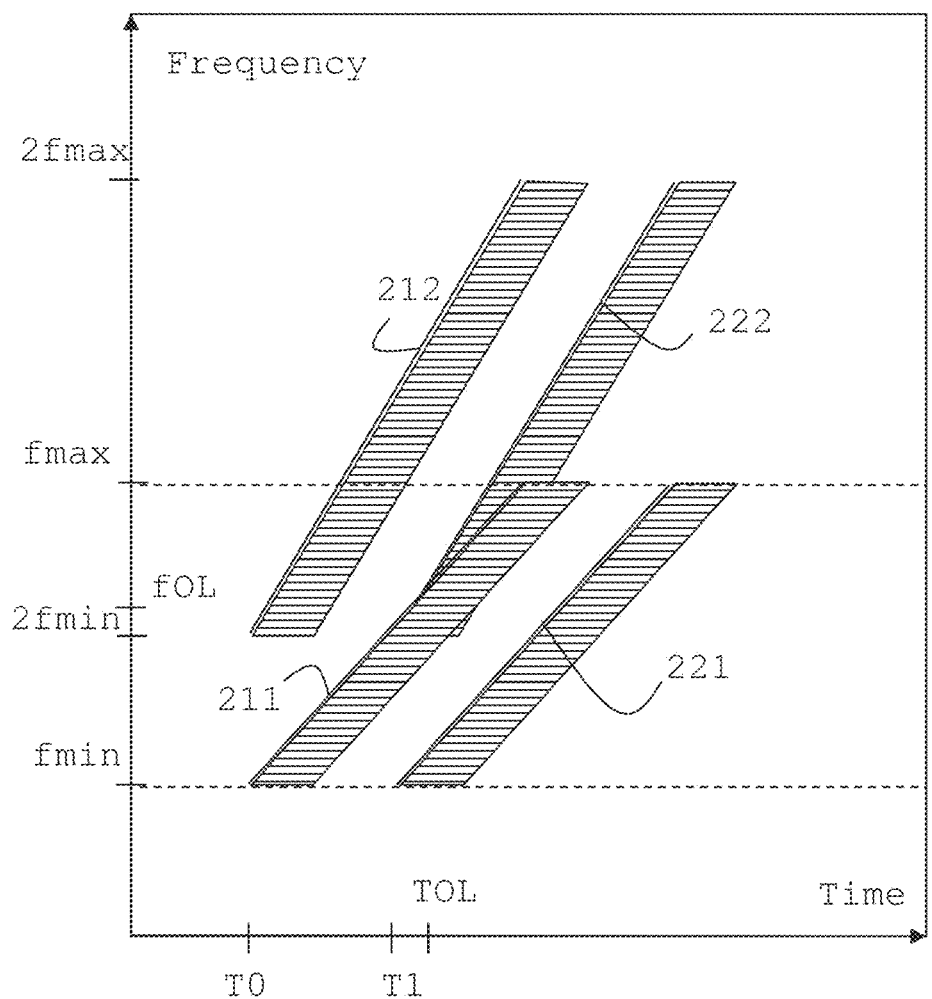
Figure 2C:
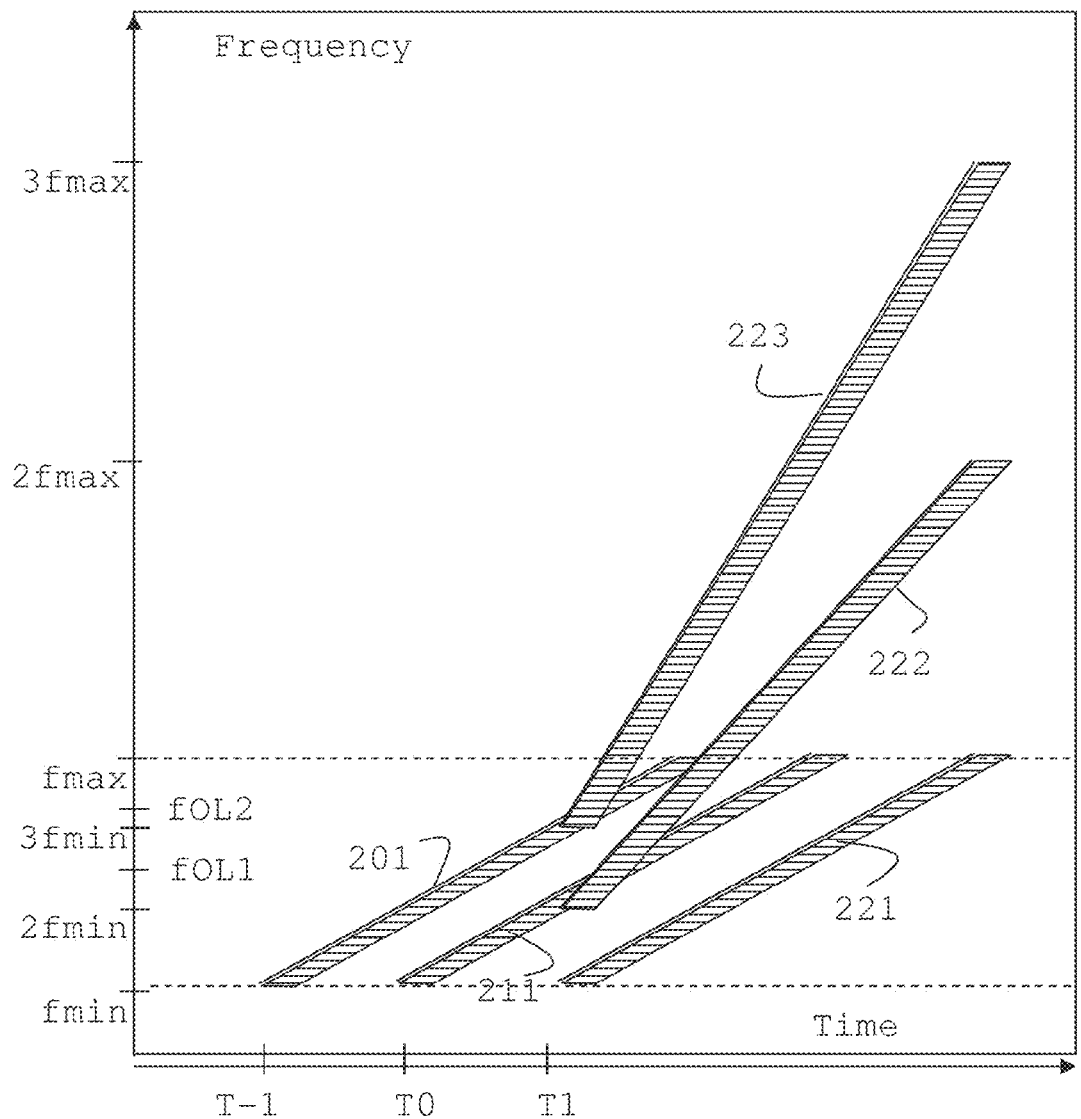

In FIGS. 2A to 2C the period between the starting time $T_0$ of a previous sweep and the starting time $T_1$ of a subsequently activated vibrator or vibrator group becomes increasingly shorter compared to the sweep length S, thus leading to an increasing overlap between the harmonics of a later sweep and the fundamentals of earlier sweeps. The survey frequency range is delimited by dashed lines at $f_{min}$ and $f_{max}$.

In the example of FIG. 2A, which illustrates common industry practice for slip-sweep acquisitions, the conditions 1A is fulfilled and there is no overlap between the (second) harmonic 222 of the later sweep 221 and the fundamental 211 of the previous sweep. However there is an overlap between the signals obtained during the listening time L of sweep 211 and the harmonics 222. The distortion of the later arrivals caused by this overlap can be attenuated or removed using for example the methods described in the above-cited U.S. Pat. No. 7,050,356. The second harmonic 212 of the fundamental 211 is shown for completeness.

The examples of FIGS. 2B and 2C illustrate acquisitions which are of relevance to the present invention. These acquisitions are typically characterized by a very short delay between successive starting times of the sweep in relation to the sweep time. In these examples, the conditions of equations 1A or 1B are no longer valid and the starting time $T_1$ is smaller than the minimum starting time $T_{min}$ as determined in these equations. Whilst making thus more efficient use of the vibrators, the increased efficiency is bought by an increased overlap between fundamentals and harmonics. The overlap is no longer limited to an overlap within the later parts of listening time of the previous sweep but extends into a full cross-over between the harmonic and the fundamental. Thus the vibrators generate the same frequencies at the same time, making it difficult to separate harmonics and fundamentals using the known methods.

In FIG. 2B there is an overlap between the second harmonic 222 and the fundamental 211 of the previous sweep at 231. At the overlap time $T_{OL}$ and the overlap frequency $f_{OL}$, the harmonic crosses the first arrivals of the fundamental sweep. The frequency interval between $f_{OL}$ and $f_{max}$ is referred to as the overlap range or overlap interval.

In FIG. 2C there is an overlap not only between the second harmonic 222 of the sweep starting at $T_1$ and the fundamental 211 of the previous sweep starting at $T_0$, but also between the third harmonic 223 of the sweep starting at $T_1$ and the fundamental 201 of the sweep which started at a time $T_{-1}$ prior to the previous sweep at $T_0$. For the sake of clarity only harmonics of the sweep starting at $T_1$ are shown.

After performing the correlation with the pilot sweep, the schematic plots of FIG. 2 change as the fundamental sweeps of a Vibroseis signal are transformed into approximately zero-phase wavelets of short duration, whereas the harmonics manifest themselves as a reverse sweep appearing at negative correlation lag times. An illustration of such a case can be found for example in the above-cited article by P. Ras et al. and in FIGS. 3 and 4 below.

The equations 1A and 1B essentially define conditions for the start time $T_1$ of the subsequent sweep to avoid an overlap of the signal with the harmonics of a subsequent sweep. If the slip sweep time is reduced to times that do not match the minimum conditions as set in equations 1A or 1B such an overlap is likely to occur. Hence, the present invention describes how to acquire and process slip-sweep data at very short slip times, e.g. when the condition set by equation 1B (as the more general condition than equation 1A) is not satisfied.

In the following an example is described to determine an estimate for the harmonics which can be applied to the full overlap frequency region including frequencies which are larger than the overlap frequency $f_{OL}$. First there is described a way of estimating the contribution of the harmonics for frequencies below the overlap frequency. This estimate can be derived using exclusively the signal traces D as obtained from the remote receivers D1, D2, D3, and D4 as shown in FIG. 1. For the purpose of this invention the remote receivers are those receivers which are adapted to obtain the seismic acquisition signals including those which traveled through the deeper layers of the earth.

According to the convolutional model, one trace of uncorrelated Vibroseis data in frequency domain, D, can be represented as a sum of the fundamental sweep and the harmonics:

$$D = R\left(w_1 H_1 + \sum_{i=2}^{n} w_i H_i\right), \quad [2]$$

where R is the earth reflectivity, $H_i$ is the harmonic phase spectra, n is the maximum harmonic order which cannot be ignored and $w_i$ are unknown frequency-dependent harmonic weights which effectively determine the amplitude with which the fundamental and harmonics, respectively, contribute to the obtained signal D. The signal or trace D, in the case of slip-sweep acquisition, is the earth's response to the fundamental and harmonics of a sweep. The length of D is typically equal to the sweep plus the listening time. The amplitude of $H_i$ is defined as unitary in the frequency range of the corresponding harmonic and zero elsewhere:

$$|H_i|=1, \text{ if } f_{min} < f < f_{max}$$

$$|H_i|=0, f < if_{min}, f > f_{max}, \quad [3]$$

where $f_{min}$ and $f_{max}$ are the minimum and maximum sweep frequencies and i is the order of the harmonics. The conditions of equation [3] apply to standard Vibroseis acquisition where the bandwidth of the survey is usually limited to the maximum frequency of the fundamental sweep.

Equation [2] can be rewritten as:

$$D = R w_1 H_1 \left(1 + \sum_{i=2}^{n} \frac{w_i H_i}{w_1 H_1}\right). \quad [4]$$

The correlation with the fundamental (treated in the equation as the harmonic of order 1), which can be approximated for example with the pilot sweep, can be expressed as:

$$DH_1^* = R w_1 H_1 H_1^* \left(1 + \sum_{i=2}^{n} \frac{w_i H_i}{w_1 H_1}\right). \quad [5]$$

Since most of the harmonic energy is located after the correlation at negative correlation lags of $DH_1^*$ in up-sweep surveys, the positive times contain essentially the term $R w_1 H_1 H_1^*$, i.e. the earth's response to the first harmonic (i.e. fundamental component) correlated with the pilot. The components of the correlated data due to the harmonics can therefore be estimated up to the nth harmonic as:

$$R H_1^* \left(\sum_{i=2}^{n} w_i H_i\right) = (\mathfrak{I}[Heav] \otimes DH_1^*) \sum_{i=2}^{n} \frac{w_i H_i}{w_1 H_1}, \quad [6]$$

where $\otimes$ denotes convolution in frequency domain.

The right hand side of equation [6] describes thus a method for estimating the harmonic noise. It shows that the portion of data the harmonics of which must be attenuated is correlated with the pure-phase fundamental (first harmonic). Positive times are extracted (by convolving with the Fourier transform of the Heayside function, if this operation is done in frequency domain) and the result is multiplied in frequency domain by a filter the transfer function of which is:

$$HPO = \sum_{i=2}^{n} \frac{w_i H_i}{w_1 H_1}. \quad [7]$$

The filter is referred to as Harmonic Prediction Operator HPO. The HPO combines the harmonic phase spectra $H_i$, which can be derived from phase spectrum of the fundament sweep as shown below, and the weights of the respective harmonic phase spectra. For up-sweep surveys, the impulse response of the HPO is anti-causal. The convolution in time domain of the HPO impulse response with the positive times of $DH_1^*$, yields the estimated correlated harmonics.

The data with the subtracted estimated harmonics can also be determined by rewriting equation 4 as:

$$Rw_1 H_1 = \frac{D}{1 + \sum_{i=2}^{n} \frac{w_i H_i}{w_1 H_1}} = \frac{D}{1 + HPO} \quad [4A]$$

The unknown harmonic weight ratios $w_i/w_1$ can be for instance determined taking into account that after correlation of an uncorrelated trace with the generic harmonic $H_i$ most of the energy due to the earth's response to $H_i$ is confined around the first arrival times, if first arrivals are the strongest events present in the data. Hence, time windowing around the first arrivals, for example using a Tukey window, i.e., a rectangular window with cosinusoidal tapers at the edges, permits therefore to exclude the contribution of the other harmonics.

Denoting a Tukey window centered around the first arrivals with T and using equation [2], the following approximation holds:

$$T \otimes DH_i^* \cong R_{sh} w_i H_i H_i^*, \quad [8]$$

where $R_{sh}$ is the shallow earth's impulse response. From equation [8] the harmonic weight ratios can be found as:

$$\frac{w_i}{w_1} = \frac{T \otimes DH_i^* |H_1|^2}{T \otimes DH_1^* |H_i|^2}. \quad [9]$$

The harmonic weights are defined only in the frequency range in common between the fundamental and the $i^{th}$ harmonic. This is the frequency range between $i^* f_{min}$ and $f_{max}$. Defining the harmonic weight ratios as $\rho_i$ and the data D when correlated with the $i^{th}$ harmonic $H_i$ and time windowed as $D_i^w$, equation [9] can be rewritten as:

$$\rho_i = \frac{D_i^w}{D_1^w} \quad [10]$$

with the $H_i$'s taken to have the value 1 in the common frequency range as defined above.

For a full determination of the HPO as per equation [7], the source harmonic phase spectra are required. These harmonic spectra can be derived from the fundamental phase spectrum using the Hilbert transform or from vibrator measurements, such as the ground force, if available.

If, for example, $Hb_1$ denotes the Hilbert transform of the pilot sweep which is taken as an approximation of $H_1$:

$$Hb_1 = R_1 - jX_1. \quad [11]$$

then the unwrapped phase can be extracted using the arctangents function:

$$\angle Hb_1 = \operatorname{atan}\left(\frac{X_1}{R_1}\right). \quad [12]$$

The R stands for the real part of the signal, which in this case is the pilot sweep and X is the imaginary part, which in this case is the 90 degrees phase shifted version of the pilot sweep. The phase of the $i^{th}$ harmonic is $i^{th}$ times the phase of the fundamental; hence the $i^{th}$ harmonic Hilbert transform with the same amplitude envelope as the fundamental is:

$$Hb_i = |Hb_1| e^{i \angle Hb_1}, \quad [13]$$

or in the real domain:

$$h_i = |Hb_1| \cos(i \angle Hb_1), \quad [14]$$

which is the inverse Fourier transform of $H_i$

The HPO can be estimated for each trace, however in low signal-to-noise ratio (S/N) conditions, it is preferable to estimate the HPO using several traces. Assuming that the HPO or the $\rho_i$ remain source consistent, i.e., constant for the same shot gather, equation [10] becomes an over-determined system of linear equations for each harmonic weight ratio $\rho_i$:

$$\rho_i = \frac{D_{ik}^w}{D_{1k}^w}, \quad [15]$$
$$k = 1 \ldots n(r)$$

where n(r) is the number of traces considered. The least-square solution of this system is:

$$\hat{\rho}_i = \frac{1}{n(r)} \sum_{k=1 \ldots n(r)} \frac{D_{ik}^w}{D_{1k}^w}. \quad [16]$$

The averaged HPO can then be estimated as:

$$\langle HPO \rangle_{n(r)} = \sum_{i=2}^{n} \frac{\hat{\rho}_i H_i}{H_1}. \quad [17]$$

The $\langle HPO \rangle_{n(r)}$ (can be designed and applied for each harmonic sequentially: After that the operator has been applied to remove the second harmonic, the data (now free of the second harmonic contribution) can be used to estimate the third harmonic weight $w_3$ and a new operator designed and applied and so on.

The above-described method for the estimation of the $\rho_i$ and thus the HPO and the effect of the harmonics on the acquired signals can be applied to any signal that represent the sweep signal transmitted into the ground. Hence, the $\rho_i$ can also be estimated using for example the ground force measurements GF which are typically made locally at the vibrator site. The ground force is typically determined as the mass-weighted sum of the reaction mass and the baseplate accelerations. The acceleration of the reaction mass and the baseplate can be measured using accelerometers mounted accordingly. From the measured ground force signal GF, a set of values $\rho_i^{GF}$ can be estimated using the above described method replacing the signals D with the signals GF.

It is important to note that the estimation of the $\rho_i^{GF}$ using the ground-force is not adversely affected in cases where the values of $T_1$ are smaller than $T_{1min}$. However, the ground-force measurements are not entirely representative of the far field signature, which determine the signals D. To use hence estimates of the harmonics based exclusively on the values $\rho_i^{GF}$ is found to be inaccurate.

The present invention therefore proposes to use an estimate of the harmonics that is partly derived from the measured signals D and partly from another representative of the fundamental sweep, which can be another set of acquired data or the ground force or any other representative of the fundamental sweep not distorted by an overlap with harmonics. The parts of the estimate in which the measured acquisition data D as the basis of the estimate are replaced by such other set of data are the time-frequency regions where there is an overlap between the harmonic response of a sweep and the fundamental response of a previous sweep.

Alternatively to the GF measurements, an overlap-free signal in the overlap frequency regions can also be derived from other measurements, for instance, by using slip-sweep data acquired with larger slip-times with the same seismic vibrator on grounds with similar properties. For example, if the starting times between sweeps exceed the nominal slip time due to synchronization problems, some data not affected by harmonic interference are generated. Thus, in principle any set of clean signals within the overlap frequency range can be used to replace the $\rho_i^{GF}$ for the purpose of this invention.

By implementing the estimate based on different sets of signals or measurements for different regions in the frequency-time domain, it was further found that to generate a more accurate estimate, the part estimates of the harmonics need to be calibrated or scaled.

A method to carry out this calibration and therefore to determine the harmonic weight ratios in the time-frequency overlapping regions matched with those in the non-overlapping region is in the following.

A set of linear equations can be written to determine $\rho_i$ at the overlapping frequencies jointly using the Ground Force measurements and the geophone data measurements by exploiting the following calibration equation:

$$\rho(f_1) = \rho^{GF}(f_1) \frac{\rho(f_2)}{\rho^{GF}(f_2)}, \qquad [18]$$

where $f_1$ is the frequency at which overlap in the time-frequency domain occur, i.e, a frequency larger than or equal $f_{OL}$ for up-sweeps, and $f_2$ is a frequency taken from a range in which the $\rho_i$ as derived from acquisition signals D are not contaminated by the overlap, and superscript GF denotes the harmonic weight ratios as derived from ground-force measurements GF.

The following over-determined system of linear calibration equations permits the determination of $\rho_i$ using a range of l frequencies (l being a number mainly determined by the quality of the data, but inherently arbitrary) selected from the non-overlap region close to $f_1$:

$$D\rho^{GF}(f)\rho(f_1) = D\rho^{GF}(f_1)\rho(f), \qquad [19]$$

where $D_{1,1}$ is a diagonal 1×1 matrix whose elements depends upon the distance from the overlap frequency $|f-f_{OL}|$ with f taken to be outside the overlap range. The elements are chosen such that for $f_1$ inside the overlap range they weigh the $\rho(f)$ in the frequency range adjacent to $f_{OL}$ but outside the overlap region with a Gaussian distribution normalized to an area of 1. If $f_1$ is outside the overlap range, the $D_{1,1}$ can be a simple diagonal matrix with zeros at all positions except for the frequency $f_1$ where the weight is chosen either as one or as a distribution which is centered around $f_1$. As a very simple example for $f_1$ inside the overlap range, the $D_{1,1}$ could for example have the values 0.5 and 0.5 for the frequencies $f_{OL-1}$ and $f_{OL-2}$ neighboring $f_{OL-2}$ and zeros at all other frequencies. The resulting linear equation system is $$0.5\rho^{GF}(f_{OL-1})\rho(f_1) = 0.5\rho^{GF}(f_1)\rho(f_{OL-1}), \text{ and}$$

$$0.5\rho^{GF}(f_{OL-2})\rho(f_1) = 0.5\rho^{GF}(f_1)\rho(f_{OL-2}) \qquad [19A]$$

In other examples the non-zero values of $D_{1,1}$ are spread over more frequencies, resulting in a smoother approximation of the Gaussian curve and involving more values $\rho(f)$ in the calculation of $\rho(f_1)$.

The $\rho(f_1)$ derived using jointly the seismic acquisition and ground-force measurement are then merged with the harmonic weight ratios derived at the frequency at which there is no interference in time-frequency domain. The $\rho(f_1)$ according to equation [18] or [19] are calculated and applied in the region between $f_{OL}$ and $f_{max}$. However, instead of choosing $f_{max}$ as the upper limit, the $\rho(f_1)$ according to equation [18] or [19] can be applied up to the frequency where the harmonic cease to interfere with the previous fundamental and its listening time. This frequency is usually smaller (in up-sweeps) than the maximum survey frequency $f_{max}$.

The updated harmonic weight ratios are used to derive the HPO as defined in equation [7]. The novel HPO can be applied to slip-sweep data to remove harmonic noise in acquisition with even very small slip-times beyond those determined by equation 1B.

Figure 3:
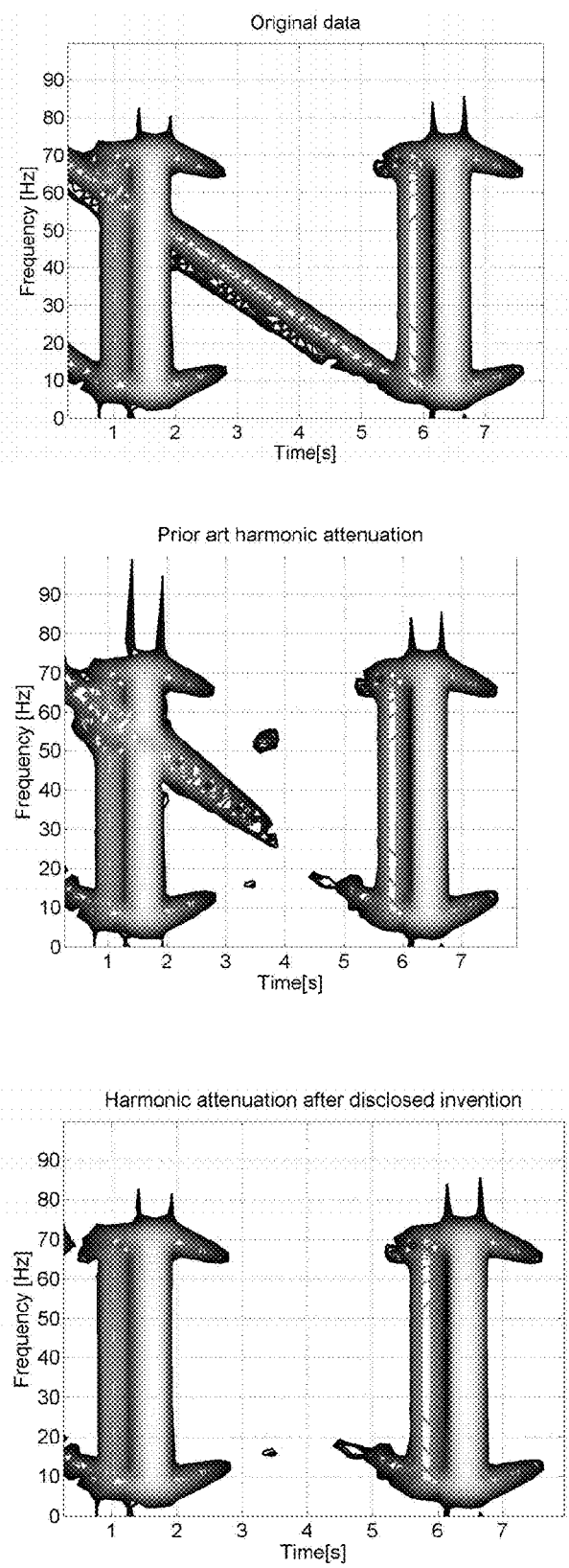
FIG. 3 includes two panels respectively illustrating the performance of a known method and of an example of the inventive method on the same data set.

FIG. 3 shows a comparison of harmonic noise attenuation using a prior art method and a method based on the present invention. The top panel shows the correlated signals and the harmonic interference. The middle panel illustrates the attenuation of harmonics using a prior art method. And the bottom illustrates the attenuation of harmonics using a method in accordance with an example of the present invention.

Figure 4:
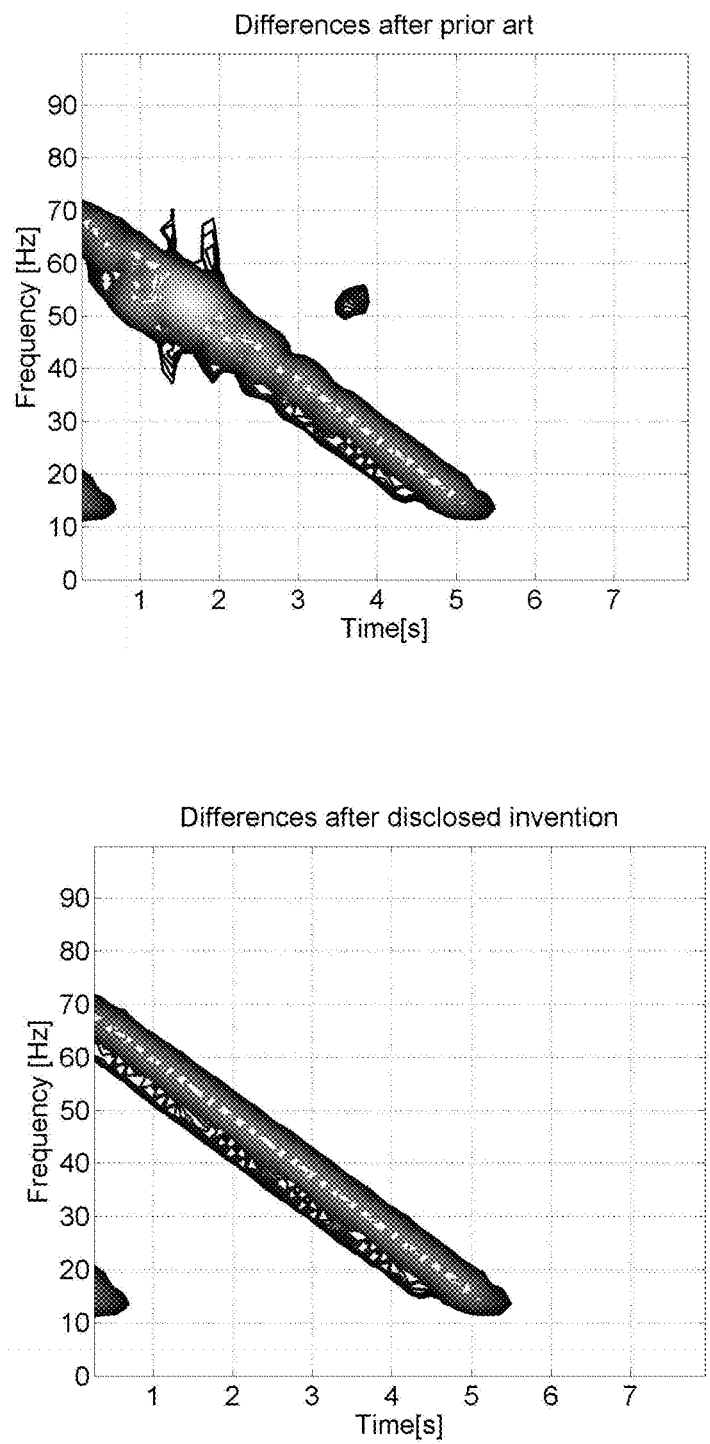
FIG. 4 includes two panels with difference plots based on FIG. 3.

In FIG. 4 the differences in the estimated harmonic noise are highlighted calculating a difference plot between the original and the attenuated data using the known method (top panel) and the method based on the present invention as shown in FIG. 3 (bottom panel). The time-frequency representation permits the visualization of the artifacts at those frequencies in which the harmonic noise of the second sweep interferes with the fundamental response of the first sweep. The artifacts disappear after application of the proposed method.

Figure 5:
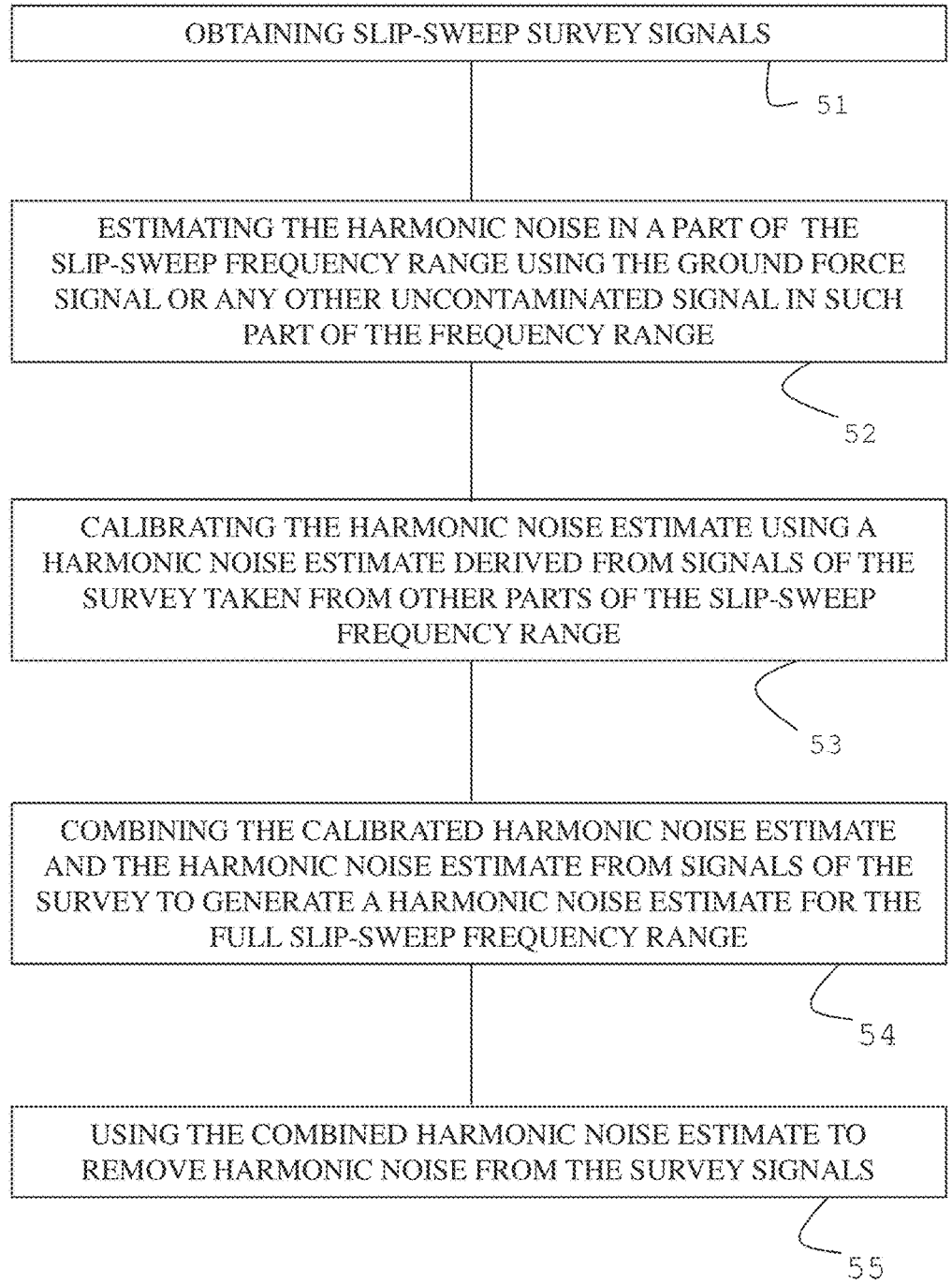
FIG. 5 shows a flowchart listing steps in accordance with an example of the present invention.

Steps in accordance with an example of the invention are shown in the chart of FIG. 5. In Step 51, signals from a slip-sweep Vibroseis survey are obtained either directly from the field survey or from data storage facilities.

Above an overlap frequency, a harmonic noise estimate is derived (Step 52) using either ground force signals or other uncontaminated representatives of the sweep signal in the overlap interval above the overlap frequency.

In Step 53 the harmonic noise estimate is calibrated using other harmonic noise estimates derived from outside the overlap interval using the obtained signals.

The calibrated harmonic noise estimate and harmonic noise estimates derived from outside the overlap interval using the obtained signals can then be combined to a harmonic noise estimate for the slip-sweep frequency range including the overlap interval (Step 54), which in Step 55 is subtracted from the obtained signals to generate a set of signal in which the harmonic noise is attenuated.

The above description of examples is referred to for illustrative purposes only. Other variants and embodiments of the invention may be regarded to be well within the scope of a skilled person once afforded with the knowledge of the invention as described above.

The invention claimed is:

1. A method for processing slip sweep seismic survey data, the method comprising:
    (a) receiving slip sweep survey data D, wherein the slip sweep survey data D comprises reflected signals from an interior section of the Earth generated by a series of sweep signals input into the interior section of the Earth by repeatedly activating vibratory sources, and wherein the series of sweep signals input into the interior section of the Earth comprises at least a current sweep produced by the vibratory sources at time T0 and a later sweep produced by the vibratory sources at time T1, and a fundamental component of the current sweep overlaps with harmonics of the later sweep, wherein the slip sweep survey includes:
        at least two vibratory sources, wherein a first source produces a sweep and a second source produces another sweep; and
        a plurality of seismic sensors receive responses of Earth interior;
    (b) obtaining overlapping frequencies or equivalent overlapping time intervals thereof, wherein the overlapping frequencies comprise frequencies at which the fundamental component of the current sweep overlaps with the harmonics of the later sweep;
    (c) using survey data D as an input to compute non-overlapping harmonic weight ratios for frequencies of the fundamental component that do not overlap with the harmonics of the later sweep;
    (d) using a data set representative of the fundamental component undistorted by harmonics to compute overlapping harmonic weight ratios for the overlapping frequencies;
    (e) combining the non-overlapping and the overlapping harmonic weight ratios and computing a harmonic prediction operator (HPO) filter for a second harmonic of the later sweep;
    (f) using the HPO filter to obtain the second harmonic of the later sweep; and
    (g) subtracting the obtained second harmonic from the survey data D.

2. The method of claim 1, wherein the steps (b) through (g) are repeated for each harmonic up to a highest harmonic of interest.

3. The method of claim 2, further comprising:
    calibrating a harmonic weight ratio at a frequency at which overlap in the time-frequency domain occurs ("f1") computed from ground force measurement with a harmonic weight ratio at a different frequency f2 that is computed from survey data D.

4. The method of claim 1, wherein the set of data representative of the fundamental sweep not distorted with harmonics is extracted from ground force measurements.

5. The method of claim 4, further comprising: calibrating a harmonic weight ratio at a frequency at which overlap in the time-frequency domain occurs ("f1") computed from ground force measurement with multiple harmonic weight ratios at different frequencies that are computed from survey data D.

6. The method of claim 5, wherein the calibration with multiple frequency ratios is in the form of:

$$D\rho^{GF}(f)\rho(f_1) = D\rho^{GF}(f_1)\rho(f),$$

where D is an acquisition signal, GF is a ground force signal, $f_1$ is a frequency at which overlap in the time-frequency domain occurs, and p is a harmonic weight ratio.

7. The method of claim 1, wherein the set of data representative of the fundamental sweep not distorted with harmonics is extracted from a different sweep at the same location.

8. The method of claim 1, wherein the HPO filter is determined using:

$$HPO = \sum_{i=2}^{n} \frac{w_i H_i}{w_1 H_1}.$$

and the harmonic-free data is determined using:

$$Rw_1 H_1 = \frac{D}{1 + \sum_{i=2}^{n} \frac{w_i H_i}{w_1 H_1}} = \frac{D}{1 + HPO}$$

where HPO is a Harmonic Prediction Operator, $w_i$ is an unknown frequency dependent harmonic weight, H is a harmonic phase spectra, R is an impulse response, and D is a signal.

9. The method of claim 1, further comprising:
    obtaining slip sweep survey data from a slip sweep survey wherein a time interval between two consecutive sweeps is short enough to cause overlaps between a fundamental component of responses of Earth interior of one sweep with a harmonic sweep of another sweep.

10. The method of claim 9, wherein the time interval between two consecutive sweeps T0-T1 violates:

$$T_1 - T_0 \geq \frac{(n-1)Sf_{max}}{n(f_{max} - f_{min})}.$$

11. The method of claim 1, further comprising processing the harmonic-free survey data to determine properties of an interior section of the Earth.

12. A computer processing system for processing slip sweep seismic survey data, the system comprising:
    a processor; and
    computer readable storage containing computer executable instructions, which, when executed by the processor, cause the processor to:
        receive, as an input, slip sweep survey data D, where a fundamental component of responses of an Earth interior to a current sweep overlaps with a harmonic sweep of a later sweep, wherein a slip sweep survey includes:
            at least two vibratory sources, wherein a first source produces a sweep and a second source produces another sweep; and (a) a plurality of seismic sensors receive responses of Earth interior;
(b) obtain overlapping frequencies for the overlap of the fundamental component of responses of the Earth interior to the current sweep and the harmonic sweep of the later sweep or equivalent overlapping time intervals to the overlapping frequencies;
(c) for frequencies where there is no overlap, use survey data D to compute harmonic weight ratios;
(d) for frequencies where there is overlap, use another set of data representative of the fundamental sweep not distorted with harmonics to compute harmonic weight ratios;
(e) combine the harmonic weight ratios for all frequencies and compute a harmonic prediction operator (HPO) filter for a second harmonic sweep;
(f) repeat steps (b) through (e) for higher harmonic sweeps up to a highest harmonic of interest;
(g) subtract all harmonic sweeps from the survey data D to obtain harmonic-free data, wherein the slip sweep survey includes:
at least two vibratory sources, wherein a first source produces a sweep and a second source produces another sweep; and
a plurality of seismic sensors receive responses of Earth interior.

13. The computer system of claim 12, wherein the set of data representative of the fundamental sweep not distorted with harmonics is extracted from ground force measurements.

14. The computer system of claim 13, wherein the instructions, which, when executed by the processor, further cause the processor to:
calibrate a harmonic weight ratio at a frequency at which overlap in the time-frequency domain occurs ("f1") computed from ground force measurement with a harmonic weight ratio at a different frequency f2 that is computed from survey data D.

15. The computer system of claim 13, wherein the instructions, which, when executed by the processor, further cause the processor to:
calibrate a harmonic weight ratio at a frequency at which overlap in the time-frequency domain occurs ("f1") computed from ground force measurement with multiple harmonic weight ratios at different frequencies that are computed from survey data D.

16. The computer system of claim 15, wherein the calibration with multiple frequency ratios is in the form of:

$$D\rho^{GF}(f)\rho(f_1) = D\rho^{GF}(f_1)\rho(f),$$

where D is an acquisition signal, GF is a ground force signal, $f_1$ is a frequency at which overlap in the time-frequency domain occurs, and p is a harmonic weight ratio.

17. The computer system of claim 12, wherein the set of data representative of the fundamental sweep not distorted with harmonics is extracted from a different sweep at the same location.

18. The computer system of claim 12, wherein the HPO filter is determined using:

$$HPO = \sum_{i=2}^{n} \frac{w_i H_i}{w_1 H_1},$$

and the harmonic-free data is determined using:

$$Rw_1 H_1 = \frac{D}{1 + \sum_{i=2}^{n} \frac{w_i H_i}{w_1 H_1}} = \frac{D}{1 + HPO}$$

where HPO is a Harmonic Prediction Operator, $w_i$ is an unknown frequency dependent harmonic weight, H is a harmonic phase spectra, R is an impulse response, and D is a signal.

19. The computer system of claim 12, wherein the instructions, which, when executed by the processor, further cause the processor to:
receiving slip sweep survey data from a slip sweep survey wherein a time interval between two consecutive sweeps is short enough to cause overlaps between a fundamental component of responses of Earth interior of one sweep with a harmonic sweep of another sweep.

20. The computer system of claim 12, wherein the instructions, which, when executed by the processor, further cause the processor to:
process the harmonic-free survey data to determine properties of an interior section of the Earth.

* * * * *